INVENTOR.
HENRY L. GORGAS
BY Richard E. Cummins
ATTORNEY

July 28, 1959 H. L. GORGAS 2,897,363

SYSTEM FOR DERIVING A PHASE ERROR SIGNAL BETWEEN TWO PULSE TRAINS

Filed Nov. 15, 1957 4 Sheets-Sheet 2

July 28, 1959 H. L. GORGAS 2,897,363

SYSTEM FOR DERIVING A PHASE ERROR SIGNAL BETWEEN TWO PULSE TRAINS

Filed Nov. 15, 1957 4 Sheets-Sheet 4

United States Patent Office 2,897,363
Patented July 28, 1959

2,897,363

SYSTEM FOR DERIVING A PHASE ERROR SIGNAL BETWEEN TWO PULSE TRAINS

Henry L. Gorgas, San Jose, Calif., assignor to International Business Machines Corporation, New York, N.Y., a corporation of New York Application November 15, 1957, Serial No. 696,867

7 Claims. (Cl. 250—27)

This invention relates in general to phase comparison systems and in particular to a system for producing a control voltage which corresponds to the direction and amount of phase error between correspondingly positioned pulses of two pulse trains.

In copending application Serial No. 654,794 filed April 24, 1957, a system is disclosed wherein an asynchronous information storage device is operated in synchronism with and under the control of a synchronous information storage device. The synchronous operation of the two devices is obtained by generating a clock pulse train for each device corresponding to the rate at which information is processed by each device, comparing each of the clock pulse trains to determine their relative phase displacements and generating a control voltage which is a function of the phase displacement to either increase or decrease the rate at which the asynchronous device is operating. As shown in the above mentioned copending application, the asynchronous device includes means for translating information stored in the form of optically sensible coded indicia into electrical pulses by moving an electron beam across the indicia at a rate determined by the control voltage applied to a variable rate sweep voltage generator. The present invention provides a relatively simple and inexpensive solution to the problem of obtaining the control voltage which is applied to the variable rate sweep voltage generator. However, it should be noted that the invention is not limited to that particular application but has many other applications.

Therefore, in accordance with the present invention a system is provided for generating a voltage which is a function of the relative phase displacement between correspondingly positioned pulses of two pulse trains, as distinguished from merely the general phase displacement between two pulse trains. Stated differently, the present invention provides a control voltage which is a function of the phase displacement between the first pulses of both pulse trains, the second pulses of both pulse trains, and so on.

It is therefore an object of the present invention to provide an improved phase comparison system.

Another object of the present invention is to provide an improved system for producing a control signal corresponding to the amount of phase difference between two pulse signals.

A further object of the present invention is to provide an improved system for producing a control signal, the amplitude of which corresponds to the amount of phase displacement between correspondingly positioned pulses of two pulse signals and the direction of which corresponds to the direction of the phase displacement.

Other objects of the invention will be pointed out in the following description and claims and illustrated in the accompanying drawings which disclose, by way of example, the principle of the invention and the best mode which has been contemplated of applying that principle.

Figure 1:
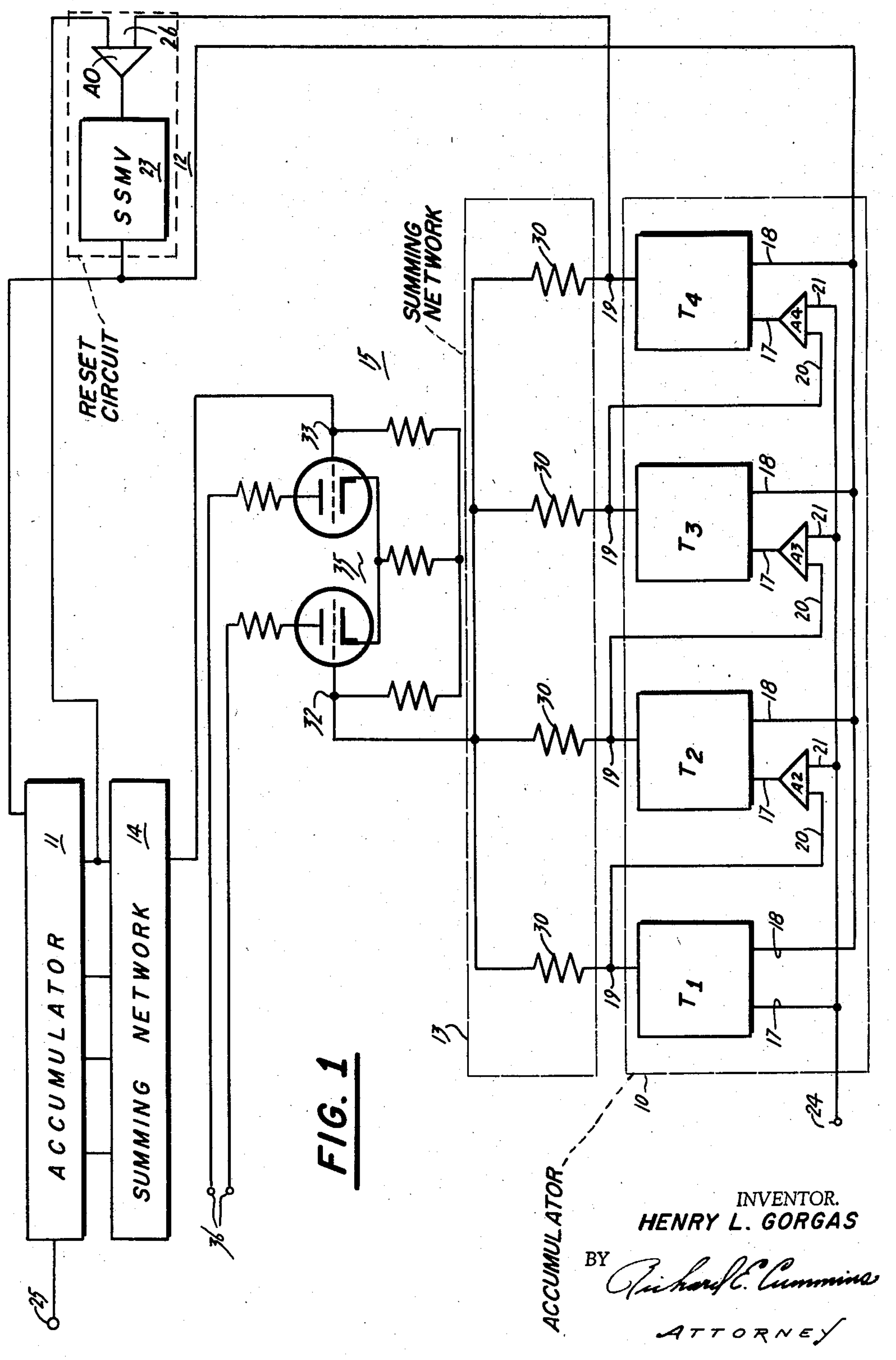
Fig. 1 illustrates schematically a phase comparison system embodying the present invention.

With reference to the drawings and particularly to Fig. 1, the system shown therein comprises generally a pair of accumulators 10 and 11, a reset circuit 12, a pair of summing networks 13 and 14, and a comparison circuit 15.

Accumulators 10 and 11 are similar so only one is shown and described in detail. Accumulator 10, as shown, comprises a plurality of bistable devices, such as triggers $T_1$ through $T_4$, and a plurality of logical "and" gates A2 through A4. Each of the triggers T has a pair of input terminals 17 and 18 and an output terminal 19. Output terminal 19, if in a low state, changes to a high state in response to a pulse applied to input terminal 17 and, if in a high state, changes to a low state in response to a pulse applied to input terminal 18. Each of the triggers T, with the exception of the first trigger $T_1$, has an associated logical "and" gate A whose output is connected to the input terminal 17 of its associated trigger. The input terminal 20 of each "and" gate A2 through A4 is connected to the output terminal 19 of the preceding trigger, while the input terminal 21 of each "and" gate A2 through A4 is connected directly to input terminal 24 of accumulator 10.

Assuming that the terminals 19 of triggers $T_1$ through $T_4$ are initially in the low state and that a pulse train is applied to input terminal 24, terminal 19 of trigger $T_1$ is flipped to its high state in response to the first pulse, terminal 19 of trigger $T_2$ is flipped to its high state in response to the second pulse, and so on until terminal 19 of the last trigger $T_4$ is flipped to its high state. Accumulator 11 operates in an identical manner in response to a pulse train supplied to input terminal 25.

The reset circuit 12 provides for resetting each of the triggers $T_1$ through $T_4$ to its initial state wherein each of the terminals 19 is low, so that the above described cycle may be repeated. As shown, reset circuit 12 comprises a single-shot multivibrator 23 for supplying a reset pulse to each of the terminals 18 of the triggers $T_1$ through $T_4$ of each accumulator 10 and 11. SSMV 23 operates in response to an output pulse from "and" gate A0 whose input terminals 26 are connected, respectively, to terminals 19 of the last triggers $T_4$ of each accumulator 10 and 11.

The number of triggers T for the accumulators 10 and 11 will, of course, depend upon the particular desired application, and it should be understood that in the illustrated embodiment only four triggers are shown to simplify the description of the system.

The system also includes a pair of summing networks 13 and 14 associated with the accumulators 10 and 11. As shown, the summing network 13 comprises a plurality of resistors 30 which are connected respectively between the terminals 19 of the triggers $T_1$ through $T_4$ and an input terminal 32 of the comparison circuit 15. The voltage applied to terminal 32 of the comparison circuit 15 is a function of the number of pulses entered into the accumulator 10. Similarly, the voltage applied to terminal 33 from summing network 14 is a function of the number of pulses into accumulator 11.

The comparison circuit 15, as shown, comprises a differential amplifier 35 having a pair of output terminals 36 which provides a voltage which is a function of the difference between the summed signals applied to terminals 32 and 33. Hence, the signal from output terminal 36 is a function of the phase displacement between the two pulse signals applied to the input terminals 24 and 25 of the accumulators 10 and 11 and may be employed to control a variable rate sweep generator, as described in the above mentioned copending application.

Figures 2A, 2B:
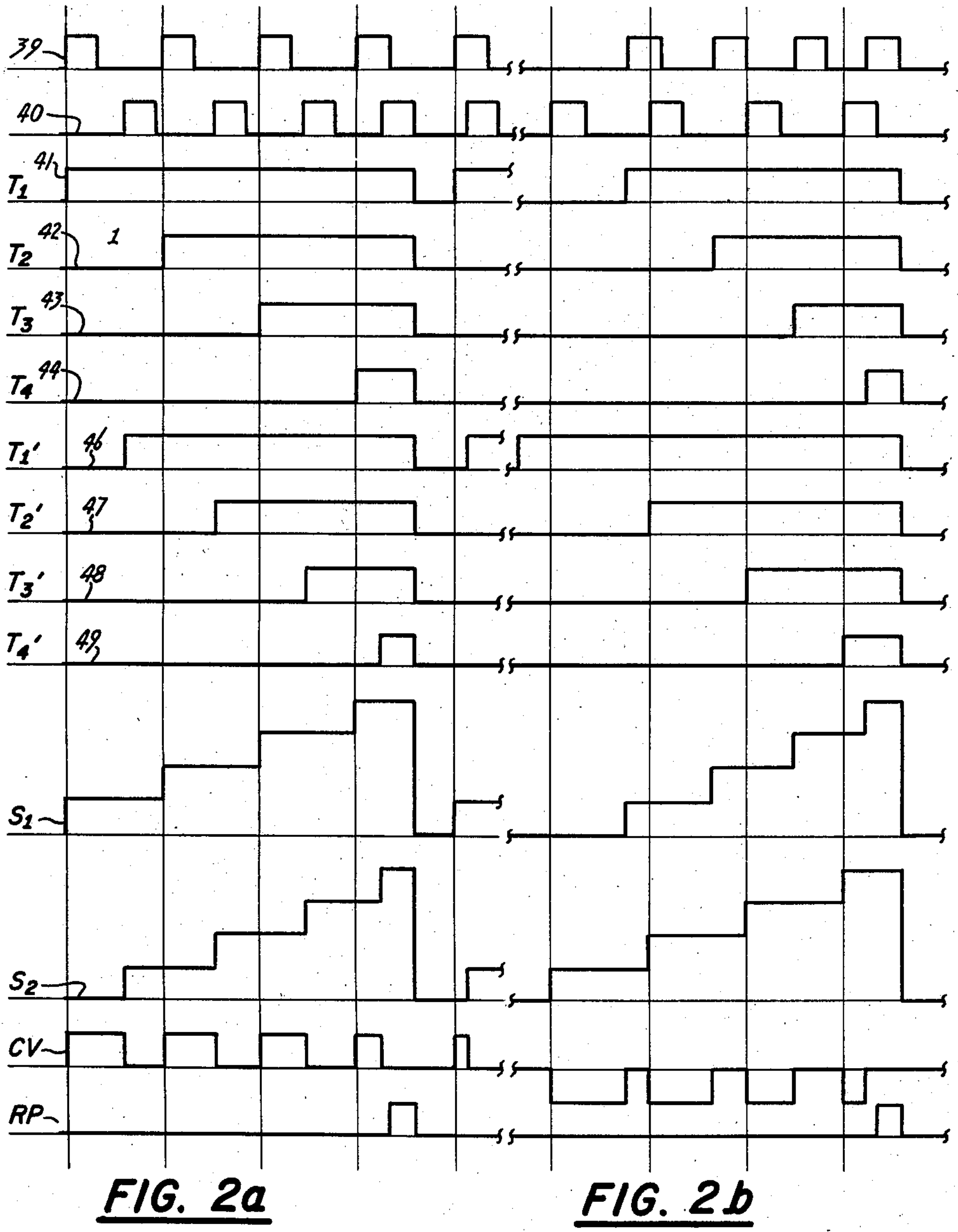
Fig. 2 is a graph illustrating voltage conditions at various points in the system shown in Fig. 1.

The operation of the phase comparison system shown in Fig. 1 may be readily seen by reference to Fig. 2 which is a graph showing voltage conditions at different points in the system at various times relative to a pair of pulse trains 39 and 40 which are applied, respectively, to terminals 24 and 25. Fig. 2*a* illustrates the condition where pulse train 39 is leading pulse train 40 and Fig. 2*b* the condition where pulse train 39 lags pulse train 40. The voltages at the terminals 19 of the triggers $T_1$ through $T_4$ are shown respectively by the curves 41 through 44, while the voltages at similar terminals of accumulator 11 are represented by curves 46 through 50. The curves designated $S_1$ and $S_2$ represent the summed voltage signals applied to terminals 32 and 33, respectively, while the curve designated CV represents the control voltage or the difference between the $S_1$ and $S_2$ signals. The reset pulse curve designated RP represents the output of SSMV 23.

It will be seen that the control voltage CV is positive when pulse train 39 leads pulse train 40 and negative when pulse train 39 lags pulse train 40, the area of the CV pulses being a function of the phase displacement.

The system shown in Fig. 1 operates satisfactorily under conditions where the two pulse trains are not out of phase by more than one pulse when the accumulators are reset by the RP pulse. It is, of course, possible to increase the number of triggers T until this condition is met since the output voltage generated by the system either increases or decreases the pulse rate of one pulse train. However, from a practical standpoint a system provided with means for transferring the difference in pulses to the next cycle after the last trigger in either accumulator has been operated may prove more economical. Such a system is shown in Fig. 3.

Figure 3:
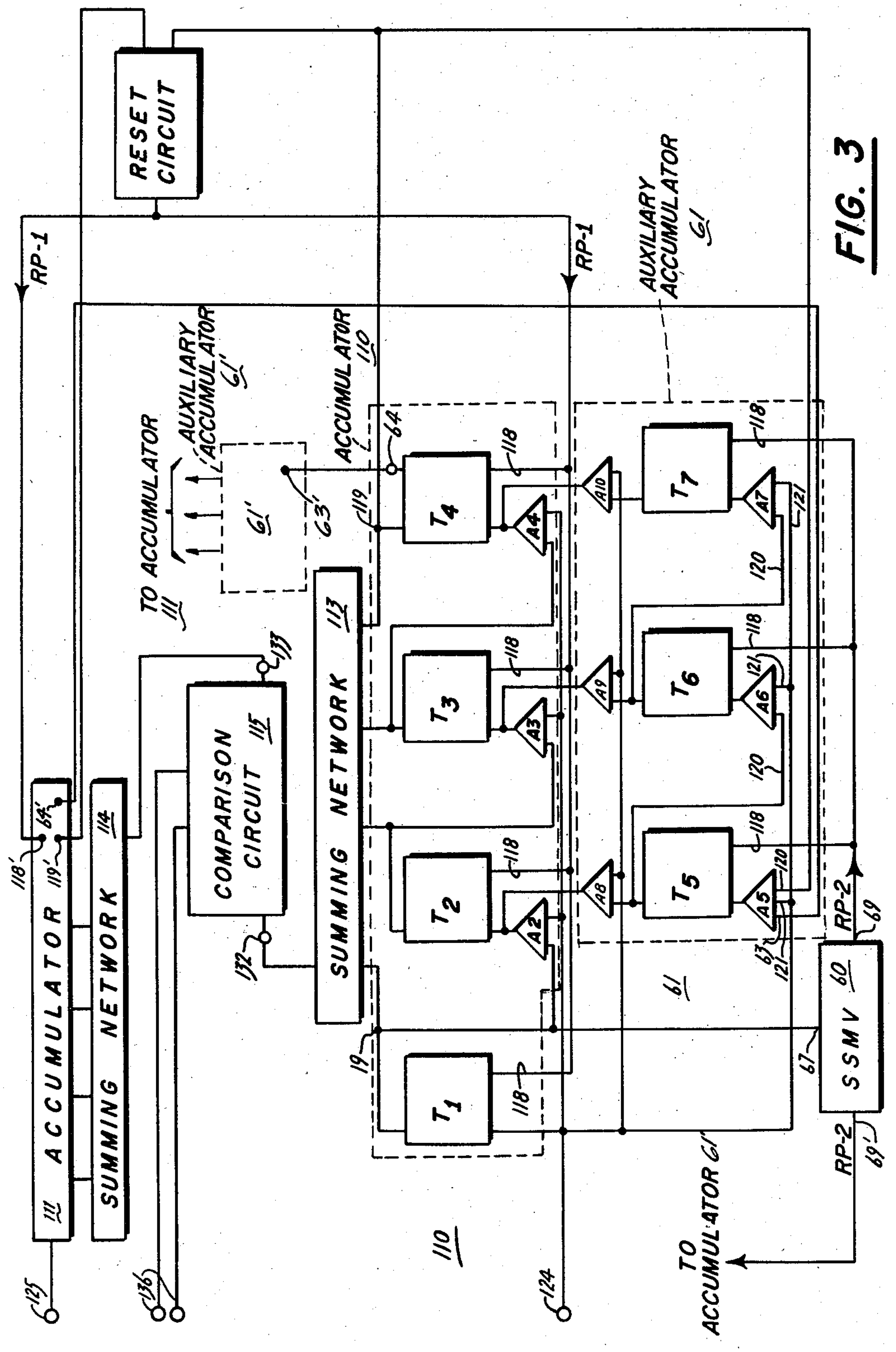
Fig. 3 illustrates a modification of the system shown in Fig. 1.

With reference to Fig. 3, the system shown therein comprises a pair of similar accumulators 110 and 111, a pair of summing networks 113 and 114, a comparison circuit 115, a reset circuit 112, and a single-shot multivibrator 60. Reset circuit 112, summing networks 113 and 114, and comparison circuit 115 are all identical to their respective counterparts illustrated and described in connection with the system shown in Fig. 1. Accumulators 110 and 111 are identical to each other but differ from accumulators 10 and 11 in that means 61 is provided for each accumulator to enter the accumulated error at the beginning of each new cycle of the accumulator. As shown, accumulator 110 comprises triggers $T_1$ through $T_4$ and associated "and" gates A2 through A4, identical to the triggers and "and" gates of accumulator 10. In addition, accumulator 110 includes an auxiliary accumulator comprising triggers $T_5$, $T_6$ and $T_7$, associated "and" gates A5, A6 and A7, and auxiliary "and" gates A8, A9 and A10. All the "and" gates except "and" gates A5 are similar and provide an output pulse in response to signals applied simultaneously to input terminals 120 and 121. "And" gate A5 has an additional input terminal 63 which is connected to terminal 64′ of accumulator 111. After trigger $T_4$ of accumulator 110 operates, triggers $T_5$, $T_6$ and $T_7$ are operated in succession by successive pulses, provided that the trigger of accumulator 111 corresponding to trigger $T_4$ of accumulator 110 has not been operated. The triggers $T_5$, $T_6$ and $T_7$ are therefore capable of accumulating a phase displacement error of one, two or three pulses between the pulse trains applied to terminals 124 and 125.

SSMV 60 is provided for resetting the triggers $T_5$ through $T_7$ of each accumulator in response to operation of the first triggers of accumulators 110 and 111. Single-shot multivibrator 60 has an input terminal 67 connected to output terminals 19 of the first triggers of accumulators 110 and 111 and output terminals 69 and 69′ connected to the respective input terminals 118 of triggers $T_5$, $T_6$ and $T_7$ of both accumulators.

Figure 4:
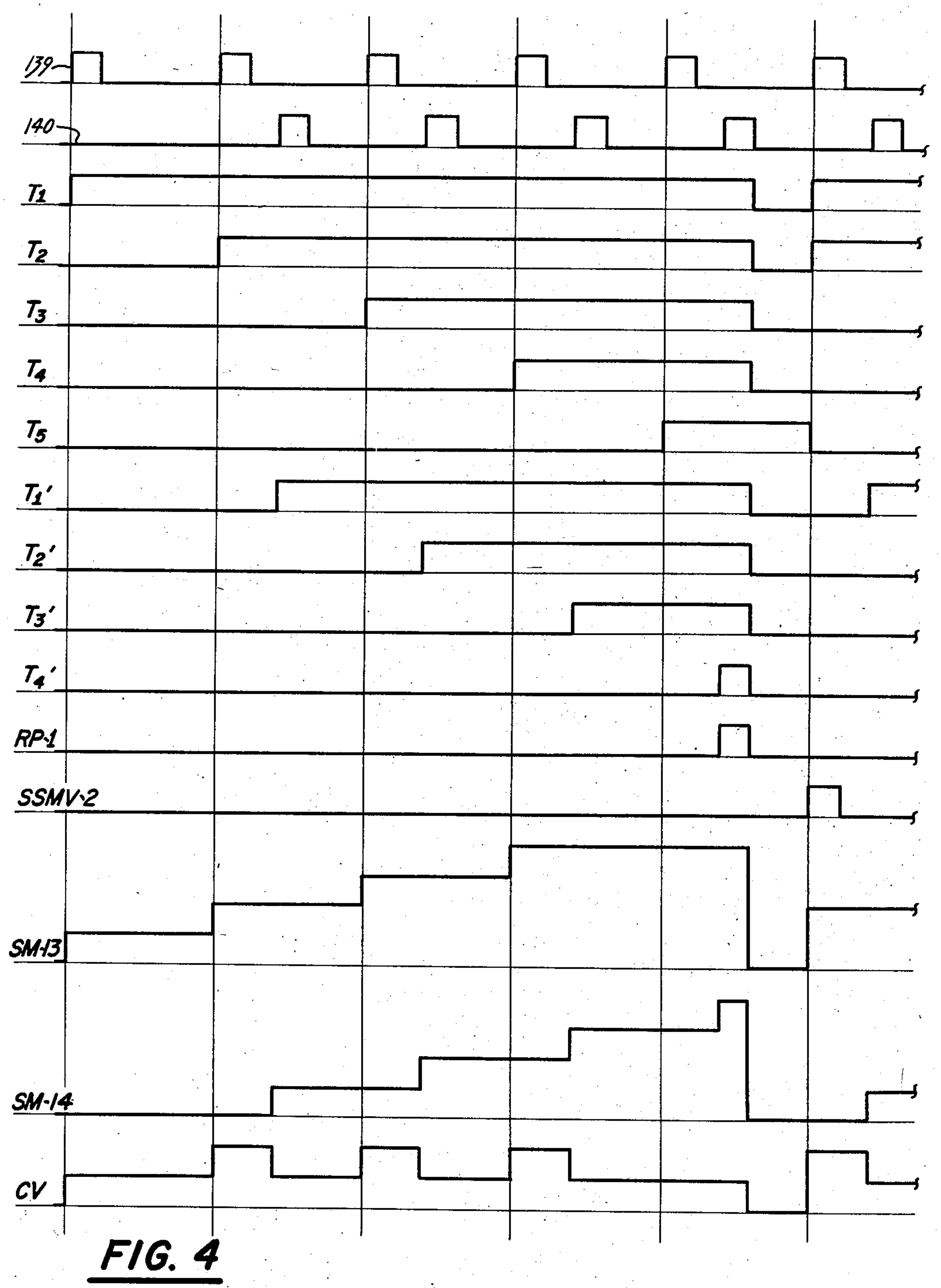
Fig. 4 is a graph similar to Fig. 2 for the modified system shown in Fig. 3.

The operation of the system shown in Fig. 3, particularly the operation of the accumulated error storage means 61, may be seen by reference to Fig. 4. The pulse trains designated 139 and 140 are applied respectively to accumulators 110 and 111 and, as shown, are out of phase by more than one pulse when trigger $T_4$ of accumulator 110 is operated. The signals $T_1$ through $T_5$ represent the output of the terminals 119 of triggers $T_1$ through $T_5$ of accumulator 110, while those designated $T_1'$ through $T_4'$ represent the output signals of these triggers of the accumulator 111. Signal RP1 represents the output of reset circuit 112 while signal SSMV 2 represents the reset pulse from the single-shot multivibrator 60 for triggers $T_5$ through $T_7$. The summed signals from summing networks 113 and 114 applied to the comparison circuit 115 are represented by the signals SM13 and SM14 and the output control voltage of the comparison circuit 115 by signal CV. With only one pulse difference between the two signals, only trigger $T_5$ is operated so that the first pulse presented to terminal 124 after the fourth trigger of accumulator 111 has been operated causes both triggers $T_1$ and $T_2$ of accumulator 110 to be operated. The phase error accumulated at the end of the first cycle is therefore carried over to the next succeeding cycle. If a two-pulse error occurs between the signals 139 and 140, triggers $T_5$ and $T_6$ are operated, and a three-pulse error operates triggers $T_5$, $T_6$ and $T_7$. Additional triggers may be provided if desired.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A system for providing a control voltage correspondingly to the relative phase displacement between correspondingly positioned pulses of first and second pulse trains, said system comprising in combination first and second accumulators associated respectively with said first and second pulse trains, each of said accumulators having a plurality of bistable devices and means interconnecting said devices to cause successive said devices to be operated from one state to another sequentially in response to successive pulses of the associated pulse train, first and second summing means associated respectively with said first and second accumulators for providing first and second voltages each of which is variable in steps corresponding to the number of pulses entered into the associated accumulator, and comparison means responsive to said first and second voltages for providing a control voltage which is a function of the relative phase displacement of said first and second pulse trains.

2. The combination recited in claim 1 including means for causing said accumulators to recycle in response to operation of a predetermined number of said bistable devices of each said accumulator.

3. The combination recited in claim 1 including means responsive to operation of the last said device of each said accumulator to reset all of said devices to their initial state.

4. The combination recited in claim 2 including means for transferring the accumulated error at the end of each said cycle to the next succeeding cycle.

5. A system for providing a control voltage corresponding to the relative phase displacement between correspondingly positioned pulses of first and second pulse trains, said system comprising in combination first and second main accumulators associated respectively with said first and second pulse trains, each said main accumulator having a predetermined number of bistable devices and means for operating said devices from one state to another in succession in response to successive pulses of said associated pulse trains, means operable to reset said devices to their initial state simultaneously, means for operating said resetting means in response to the joint operation of the last device of each said main accumulator, first and second auxiliary accumulators each having a predetermined number of bistable devices, means operable to cause said devices of each said auxiliary accumulator to be operated from one state to another in succession in response to pulses of the associated pulse train following operation of said last device of said associated main accumulator and preceding operation of said resetting means, means cooperating with said operated devices of said auxiliary accumulators to cause operation of a corresponding number of said devices of said main accumulator in response to the first pulse of the associated pulse train succeeding operation of said resetting means, and means for providing a control voltage in accordance with the difference in the number of operated devices of said main accumulators.

6. The combination recited in claim 5 in which said last named means comprises a differential amplifier provided with a pair of input terminals and a pair of summing networks connected respectively between said input terminals and said first and second main accumulators.

7. The combination recited in claim 6 further comprising means for resetting said devices of said auxiliary accumulators to said one state in response to operation of the first device of either said main accumulator.

References Cited in the file of this patent

UNITED STATES PATENTS

| | | |
|---|---|---|
| 2,784,396 | Kaiser et al. | Mar. 5, 1957 |
| 2,794,928 | Frank | June 4, 1957 |